US012804535B2

(12) United States Patent
Shi et al.

(10) Patent No.: US 12,804,535 B2
(45) Date of Patent: Nov. 17, 2026

(54) METHODS AND SYSTEMS FOR DYNAMIC TRANSMISSION SWITCHING AMONG MULTIPLE BANDS

(71) Applicant: ZTE Corporation, Shenzhen (CN)

(72) Inventors: Jing Shi, Shenzhen (CN); Xingguang Wei, Shenzhen (CN); Xianghui Han, Shenzhen (CN); Shuaihua Kou, Shenzhen (CN); Min Ren, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 5 days.

(21) Appl. No.: 18/506,488

(22) Filed: Nov. 10, 2023

(65) Prior Publication Data

US 2024/0137858 A1 Apr. 25, 2024

Related U.S. Application Data

(63) Continuation of application No. PCT/CN2022/073942, filed on Jan. 26, 2022.

(51) Int. Cl.
*H04W 48/20* (2009.01)
*H04W 72/1268* (2023.01)
*H04W 72/231* (2023.01)

(52) U.S. Cl.
CPC ....... *H04W 48/20* (2013.01); *H04W 72/1268* (2013.01); *H04W 72/231* (2023.01)

(58) Field of Classification Search
CPC ..... H04W 48/20; H04W 72/12; H04W 28/08; H04W 72/40; H04W 72/50; H04W 72/51; H04W 72/512; H04W 72/23; H04W 72/232; H04L 5/0094; H04L 5/0098; H04L 5/001
See application file for complete search history.

(56) References Cited

U.S. PATENT DOCUMENTS 11,357,004 B1 * 6/2022 Pawar .................... H04L 5/0098
12,199,763 B2 * 1/2025 Karmoose ............. H04L 1/0041
2019/0364602 A1 * 11/2019 Yi ...................... H04W 74/0833
2020/0314820 A1 * 10/2020 Kim ...................... H04L 5/0058
2020/0413305 A1 12/2020 Rahman et al.
2021/0092763 A1 * 3/2021 Li .......................... H04L 1/1671
(Continued)

FOREIGN PATENT DOCUMENTS

WO 2021077432 A1 4/2021
WO 2021162620 A1 8/2021
WO 2023141801 A1 8/2023

OTHER PUBLICATIONS

International Search Report for International Application No. PCT/CN2022/073942, Mail Date: Nov. 1, 2022. 9 pages.
(Continued)

*Primary Examiner* — Kevin T Bates
(74) *Attorney, Agent, or Firm* — Ashurst Perkins Coie US LLP

(57) ABSTRACT

Methods and systems for techniques for dynamic transmission switching among multiple bands are disclosed. In an implementation, a method of wireless communication includes receiving, by a user device, a signaling for a cell selection to select a subset of cells within up to two bands out of a set of cells within three or more bands, and performing, by the user device, a transmission on one or more cells within the selected subset of cells.

20 Claims, 11 Drawing Sheets

(56) References Cited

U.S. PATENT DOCUMENTS

| | | | | |
|---|---|---|---|---|
| 2021/0219195 | A1* | 7/2021 | Zhang | H04W 76/11 |
| 2021/0329646 | A1* | 10/2021 | Fakoorian | H04W 72/53 |
| 2022/0303974 | A1* | 9/2022 | Cui | H04W 76/15 |
| 2023/0043834 | A1* | 2/2023 | Takeda | H04L 5/001 |
| 2023/0102290 | A1* | 3/2023 | Babaei | H04L 5/0098 370/329 |
| 2023/0189255 | A1* | 6/2023 | Bagheri | H04L 1/1812 370/329 |
| 2023/0276410 | A1* | 8/2023 | Chen | H04W 72/1268 370/329 |
| 2023/0292311 | A1* | 9/2023 | Cao | H04L 5/001 |
| 2023/0328652 | A1* | 10/2023 | Zhou | H04W 52/0229 370/318 |
| 2024/0250799 | A1* | 7/2024 | Rastegardoost | H04L 5/0096 |
| 2024/0422772 | A1* | 12/2024 | MolavianJazi | H04W 72/1263 |
| 2024/0422811 | A1* | 12/2024 | Zhou | H04W 72/21 |

OTHER PUBLICATIONS

"New WID on Multi-carrier enhancements" 3GPP TSG RAN Meeting #94e Electronic Meeting, Dec. 6-17, 2021, RP-213564, sections 3-4.

Extended European Search Report mailed Jan. 22, 2025 for European Patent Application No. 22922652.7, 15 pages.

Huawei et al: "Comments on Rel-18 Uplinkdraft WID", 3GPP Draft; RP-213159, 3rd Generation Partnership Project (3GPP), Mobile Competence Centre ; 650, Route Des Lucioles ; F-06921 Sophia-Antipolis Cedex ; France, vol. TSG RAN, No. Electronic Meeting; Dec. 6, 2021-Dec. 17, 2021 Nov. 29, 2021 (Nov. 29, 2021), XP052097276, Retrieved from the Internet: URL:https://ftp.3gpp.org/tsg_ran/TSG_RAN/TSGR_94e/Docs/RP-213159.zip RP-213159 Comments on Rel-18 Uplink draft WID.doc [retrieved on Nov. 29, 2021].

NTT Docomo, Inc.: "New WID on Multi-carrier enhancements", 3GPP Draft; RP-213564, 3rd Generation Partnership Project (3GPP), Mobile Competence Centre ; 650, route des Lucioles ; F-06921 SophiaAntipolis Cedex France, vol. TSG RAN, No. Electronic Meeting; Dec. 6, 2021-Dec. 17, 2021, Dec. 10, 2021 (Dec. 10, 2021), XP052097639, Mobile Competence Centre ; 650, route des Lucioles ; F-06921 SophiaAntipolis Cedex ; France.

* cited by examiner

METHODS AND SYSTEMS FOR DYNAMIC TRANSMISSION SWITCHING AMONG MULTIPLE BANDS

CROSS REFERENCE TO RELATED APPLICATIONS

This patent document is a continuation of and claims benefit of priority to International Patent Application No. PCT/CN2022/073942, filed on Jan. 26, 2022. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for dynamic transmission switching among multiple bands.

In one aspect, a method of data communication is disclosed. The method includes receiving, by a user device, a signaling for a cell selection to select a subset of cells within up to two bands out of a set of cells within three or more bands, and performing, by the user device, a transmission on one or more cells within the selected subset of cells.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
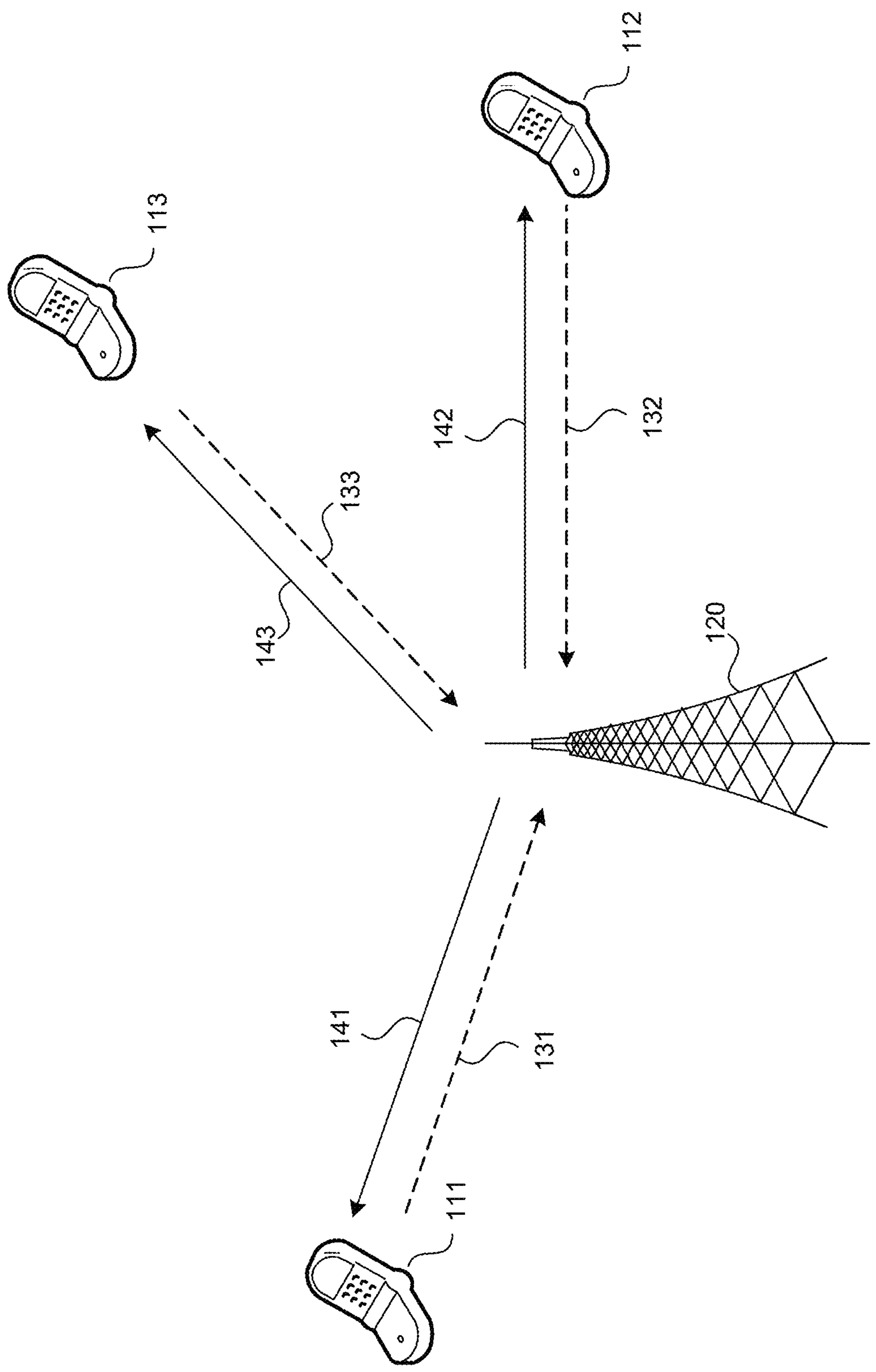
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
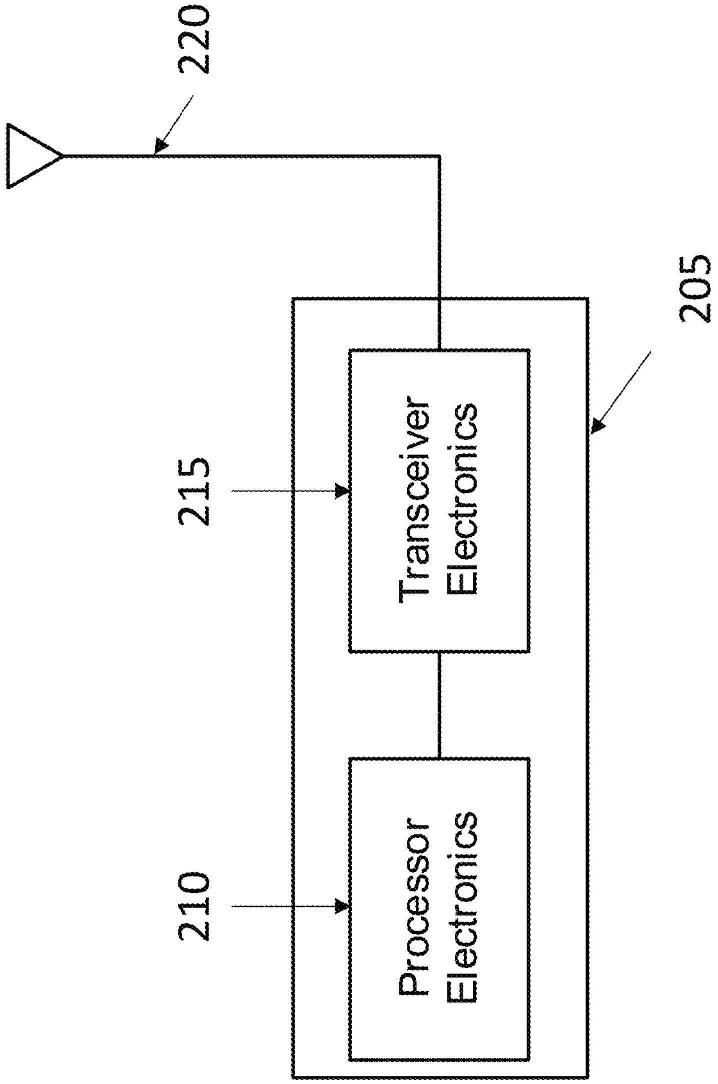
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems support features of enhanced mobile broadband (eMBB), ultra-reliable low-latency communication (URLLC), and massive machine-type communication (mMTC). In addition, a full-duplex data transmission is a requirement for 5G and further communication system.

In the wireless communication system, the uplink transmission (UL Tx) switching can be performed within up to 2 configured bands. Under the current standard, there are some limitations on multi-carrier UL operations. For example, 2 Tx UE can be configured with at most 2 UL bands, which can be changed only by RRC reconfiguration, and UL Tx switching can be performed only between 2 UL bands for 2Tx UE. Dynamically selecting carriers with UL Tx switching, e.g., based on the data traffic, TDD DL/UL configuration, bandwidths and channel conditions of each band, instead of RRC-based cell(s) reconfiguration, may potentially lead to a higher UL data rate, spectrum utilization and UL capacity. However, the current standard does not support UL Tx switching schemes that can be performed across up to 3 or 4 bands with a restriction on simultaneous transmission that up to 2 Tx simultaneous transmissions can be performed for frequency range 1 (FR1) UEs, including mechanisms that enable more configured UL bands than its simultaneous transmission capability and support dynamic Tx carrier switching across the configured bands. The disclosed technology can be implemented in some embodiments to achieve the dynamic Tx switching across more than 2 bands while satisfying the restriction on simultaneous transmission that up to 2 Tx transmissions can be performed simultaneously.

R16 Tx Switching (Two Carriers with 1Tx-2Tx Switching)

Release 16 specifies UE requirements to allow a switching between Case 1 and Case 2 below for a case of two uplink carriers' inter-band E-UTRA—NR dual connectivity (EN-DC) without Supplementary Uplink (SUL), inter-band uplink carrier aggregation (UL CA) and standalone SUL for UE supporting maximum concurrent transmissions of 2.

| | |
|---|---|
| Case 1 | 1 Tx on carrier 1 and 1 Tx on carrier 2 |
| Case 2 | 0 Tx on carrier 1 and 2 Tx on carrier 2 |

For SUL and CA option 1

| | Number of Tx chains in WID (carrier 1 + carrier 2) | Number of antenna ports for UL transmission (carrier 1 + carrier 2) |
|---|---|---|
| Case 1 | 1T + 1T | 1P + 0P |
| Case 2 | 0T + 2T | 0P + 2P, 0P + 1P |

For CA option 2

| | Number of Tx chains in WID (carrier 1 + carrier 2) | Number of antenna ports for UL transmission (carrier 1 + carrier 2) |
|---|---|---|
| Case 1 | 1T + 1T | 1P + 0P, 1P + 1P, 0P + 1P |
| Case 2 | 0T + 2T | 0P + 2P, 0P + 1P |

R17 Tx Switching (Two Carriers with 2TX-2TX Switching, Three Carriers on Two Bands with 1TX-2TX or 2TX-2TX Switching)

Release 17 specifies UE requirements to enable Tx switching between different cases.

The scenarios include:

For Tx switching based on SUL band combination, or uplink CA band combination

| | Number of Tx chains in WID (carrier 1 + carrier 2) |
|---|---|
| Case 2 | 0T + 2T |
| Case 3 | 2T + 0T |

For Tx switching based on uplink CA band combination

| | Number of Tx chains in WID (carrier 1 + carrier 2) |
|---|---|
| Case 1 | 1T + 1T |
| Case 2 | 0T + 2T |
| Case 3 | 2T + 0T |

Release 17 also specifies UE requirements to enable Tx switching between different cases, where 1 carrier on band A and 2 contiguous aggregated carriers on band B, and band A is for SUL and band B is a non-SUL band.

The scenarios include:

For Tx switching based on SUL band combination, or uplink CA band combination

| | Number of Tx chains in WID (band A + band B) |
|---|---|
| Case 1 | 1T + 1T |
| Case 2 | 0T + 2T |

and

| | Number of Tx chains in WID (band A + band B) |
|---|---|
| Case 2 | 0T + 2T |
| Case 3 | 2T + 0T |

For Tx switching based on uplink CA band combination

| | Number of Tx chains in WID (band A + band B) |
|---|---|
| Case 1 | 1T + 1T |
| Case 2 | 0T + 2T |
| Case 3 | 2T + 0T |

Release 17 specifies Tx switching between two carriers: 2Tx-2Tx switching between two uplink carriers, the mapping between UL transmission ports and Tx chain for SUL and UL CA Option 1 is defined as follows.

| | Number of Tx chains in WID (carrier 1 + carrier 2) | Number of antenna ports for UL transmission (carrier 1 + carrier 2) |
|---|---|---|
| Case 2 | 0T + 2T | 0P + 2P, 0P + 1P |
| Case 3 | 2T + 0T | 2P + 0P, 1P + 0P |

2Tx-2Tx switching between two uplink carriers, the mapping between UL transmission ports and Tx chain for UL CA Option 2 is defined as follows.

| | Number of Tx chains in WID (carrier 1 + carrier 2) | Number of antenna ports for UL transmission (carrier 1 + carrier 2) |
|---|---|---|
| Case 1 | 1T + 1T | 1P + 0P, 1P + 1P, 0P + 1P |
| Case 2 | 0T + 2T | 0P + 2P, 0P + 1P |
| Case 3 | 2T + 0T | 2P + 0P, 1P + 0P |

For UL-CA Option2, if UL Tx switching is triggered for 1-port transmission on a carrier and the state of Tx chains after the UL Tx switching is not unique, a new RRC parameter is introduced to configure between 1) and 2):

1) The state of Tx chains supporting 2Tx transmission on the carrier is assumed.

2) 1Tx on carrier 1 and 1Tx on carrier 2 is assumed.

Release 17 specifies Tx switching between three carriers:

1Tx-2Tx switching between 1 carrier on Band A and 2 contiguous carriers on Band B, the mapping between UL transmission ports and Tx chain for SUL and UL CA Option 1 is defined as follows.

| | Number of Tx chains in WID (band A + band B) | Number of antenna ports for UL transmission (band A (carrier 1) + band B (carrier 2 + carrier 3)) |
|---|---|---|
| Case 1 | 1T + 1T | 1P + (0P + 0P) |
| Case 2 | 0T + 2T | 0P + (2P + 0P), 0P + (0P + 2P), 0P + (2P + 2P), 0P + (1P + 0P), 0P + (0P + 1P), 0P + (1P + 1P), 0P + (1P + 2P), 0P + (2P + 1P) |

1Tx-2Tx switching between 1 carrier on Band A and 2 contiguous carriers on Band B, the mapping between UL transmission ports and Tx chain for UL CA Option 2 is defined as follows.

| | Number of Tx chains in WID (band A + band B) | Number of antenna ports for UL transmission (band A (carrier 1) + band B (carrier 2 + carrier 3)) |
|---|---|---|
| Case 1 | 1T + 1T | 1P + (0P + 0P), 1P + (1P + 0P), 1P + (0P + 1P), 1P + (1P + 1P), 0P + (1P + 0P), 0P + (0P + 1P), 0P + (1P + 1P) |
| Case 2 | 0T + 2T | 0P + (2P + 0P), 0P + (0P + 2P), 0P + (2P + 2P), 0P + (1P + 0P), 0P + (0P + 1P), 0P + (1P + 1P), 0P + (1P + 2P), 0P + (2P + 1P) |

2Tx-2Tx switching between 1 carrier on Band A and 2 contiguous carriers on Band B, the mapping between UL transmission ports and Tx chain for SUL and UL CA Option 1 is defined as follows.

| | Number of Tx chains in WID (band A + band B) | Number of antenna ports for UL transmission (band A (carrier 1) + band B (carrier 2 + carrier 3)) |
|---|---|---|
| Case 2 | 0T + 2T | 0P + (2P + 0P), 0P + (0P + 2P), 0P + (2P + 2P), 0P + (1P + 0P), 0P + (0P + 1P), 0P + (1P + 1P), 0P + (1P + 2P), 0P + (2P + 1P) |
| Case 3 | 2T + 0T | 2P + (0P + 0P), 1P + (0P + 0P) |

2Tx-2Tx switching between 1 carrier on Band A and 2 contiguous carriers on Band B, the mapping between UL transmission ports and Tx chain for UL CA Option 2 is defined as follows.

| | Number of Tx chains in WID (band A + band B) | Number of antenna ports for UL transmission (band A (carrier 1) + band B (carrier 2 + carrier 3)) |
|---|---|---|
| Case 1 | 1T + 1T | 1P + (0P + 0P), 1P + (1P + 0P), 1P + (0P + 1P), 1P + (1P + 1P), 0P + (1P + 0P), 0P + (0P + 1P), 0P + (1P + 1P) |
| Case 2 | 0T + 2T | 0P + (2P + 0P), 0P + (0P + 2P), 0P + (2P + 2P), 0P + (1P + 0P), 0P + (0P + 1P), 0P + (1P + 1P), 0P + (1P + 2P), 0P + (2P + 1P) |
| Case 3 | 2T + 0T | 2P + (0P + 0P), 1P + (0P + 0P) |

Figure 3:
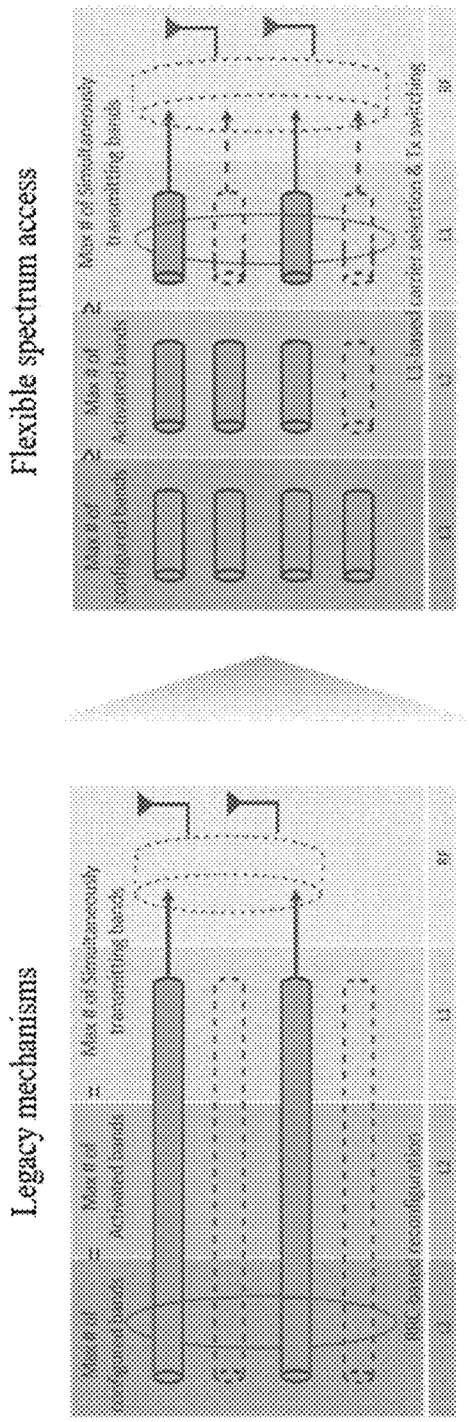
FIG. 3 shows a comparison between legacy mechanisms and a flexible spectrum access mechanism.

FIG. 3 shows a comparison between legacy mechanisms and a flexible spectrum access mechanism.

In some implementations, there can be mechanisms that allow a UE (e.g., 2Tx or 3Tx UE) to be configured with more UL bands than its simultaneous transmission capability and specify mechanisms for dynamic carrier selection as well as Tx switching between n (n>=2) configured bands applicable to SUL, CA and DC.

Dynamic Carrier Selection as Well as Tx Switching

Flexible spectrum access (FSA) provides a mechanism for dynamically selecting a subset of configured carriers and correspondingly switching Tx for transmission based on the traffic, TDD D/U configuration and channel condition of each band, instead of switching using RRC-based cell(s) or cell group(s) reconfiguration which requires much longer latency to complete such a selection/switch.

In some implementations, there is no RRC/L1 signaling for band selection, and thus it is achieved by cell/carrier RRC reconfiguration or MAC CE SCell activation/deactivation.

Figure 4:
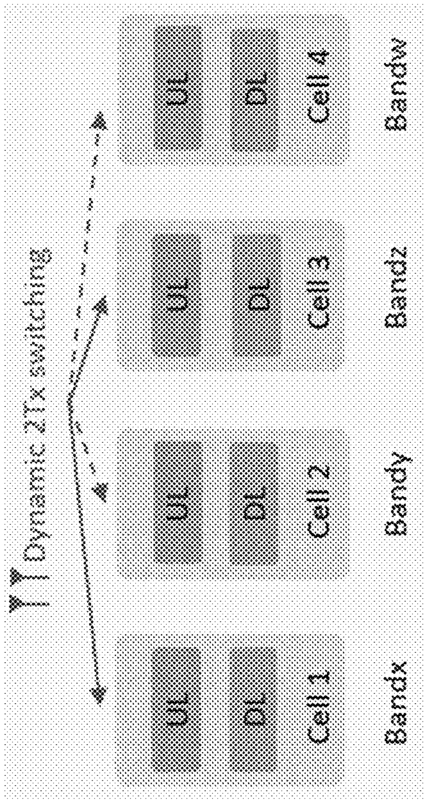
FIG. 4 shows an example of dynamic 2Tx switching based on some embodiments of the disclosed technology.

FIG. 4 shows an example of dynamic 2Tx switching based on some embodiments of the disclosed technology.

Under the current standard including Release 17, for uplink, the network needs to configure serving cell(s) to comply with UE uplink capabilities derived from the FeatureSetCombination requirement, regardless of the status of the serving cell(s), e.g., activated or deactivated. In Release 15-Release 17, 2Tx UE can only configure and activate/deactivate serving cells on up to 2 UL bands. Thus, 2Tx UE can select/switch carriers among more than 2 bands only by RRC reconfiguration.

In some implementations, UE can be configured with and activated on more than two bands while only utilizing one or two of those bands for concurrent PUSCH transmission with only 2 concurrent Tx RF chains. Accordingly, FSA provides a mechanism for dynamically selecting a subset of configured carriers and correspondingly switch Tx for transmission based on the traffic, TDD D/U configuration, bandwidth and channel condition of each band.

In some implementations, the configured bands/cells/carriers are used to select the final used cells/carriers within the two bands. Because the network needs to configure serving cell(s) to comply with UE uplink capabilities derived from the FeatureSetCombination requirement, regardless of the status of the serving cell(s), e.g., activated or deactivated.

Figure 5:
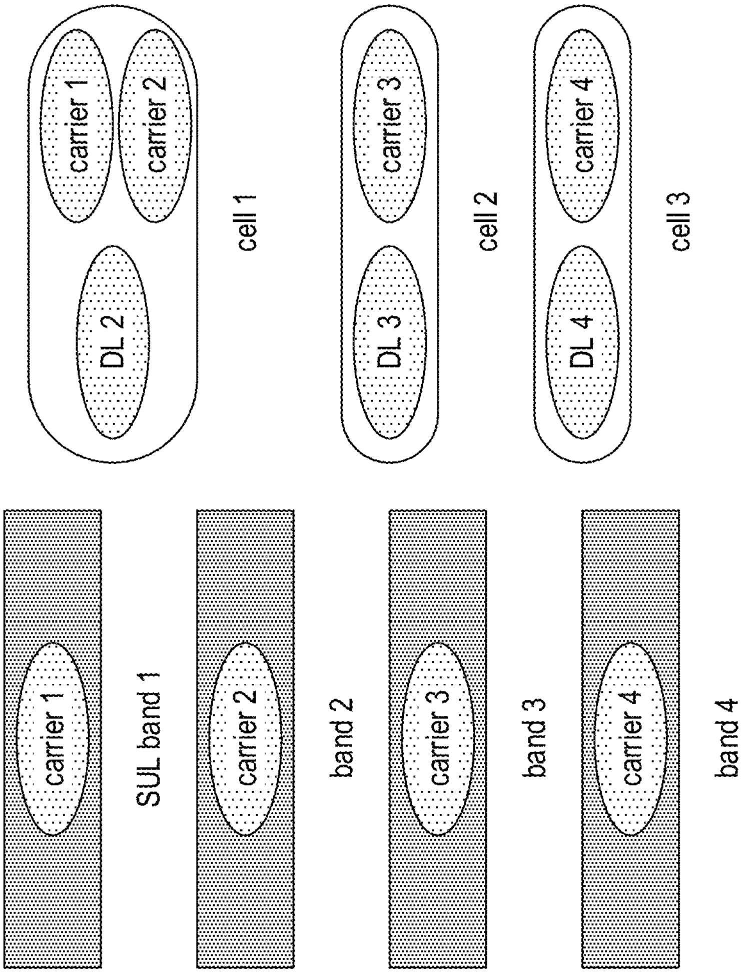
FIG. 5 shows an example of transmission switching based on some embodiments of the disclosed technology.
Figure 6:
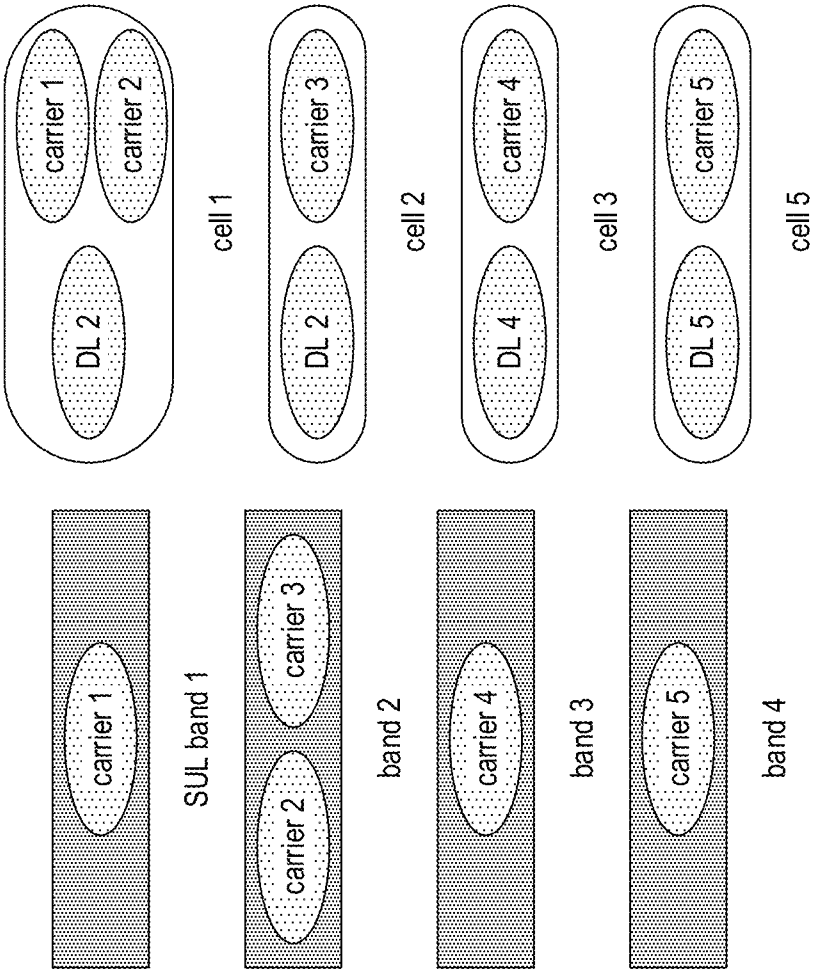
FIG. 6 shows another example of transmission switching based on some embodiments of the disclosed technology.
Figure 7:
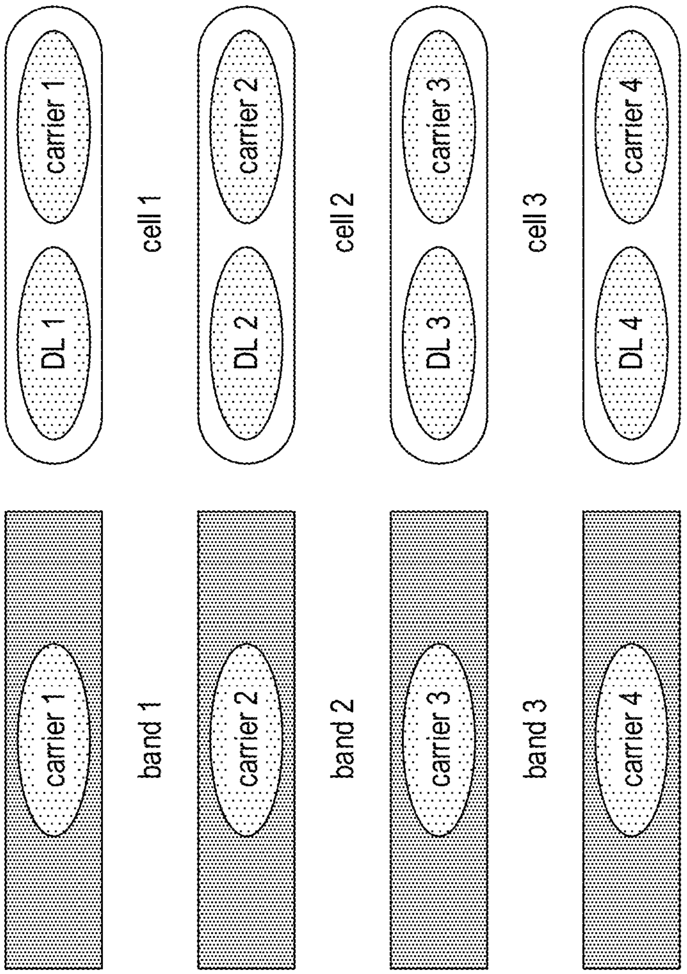
FIG. 7 shows another example of transmission switching based on some embodiments of the disclosed technology.
Figure 8:
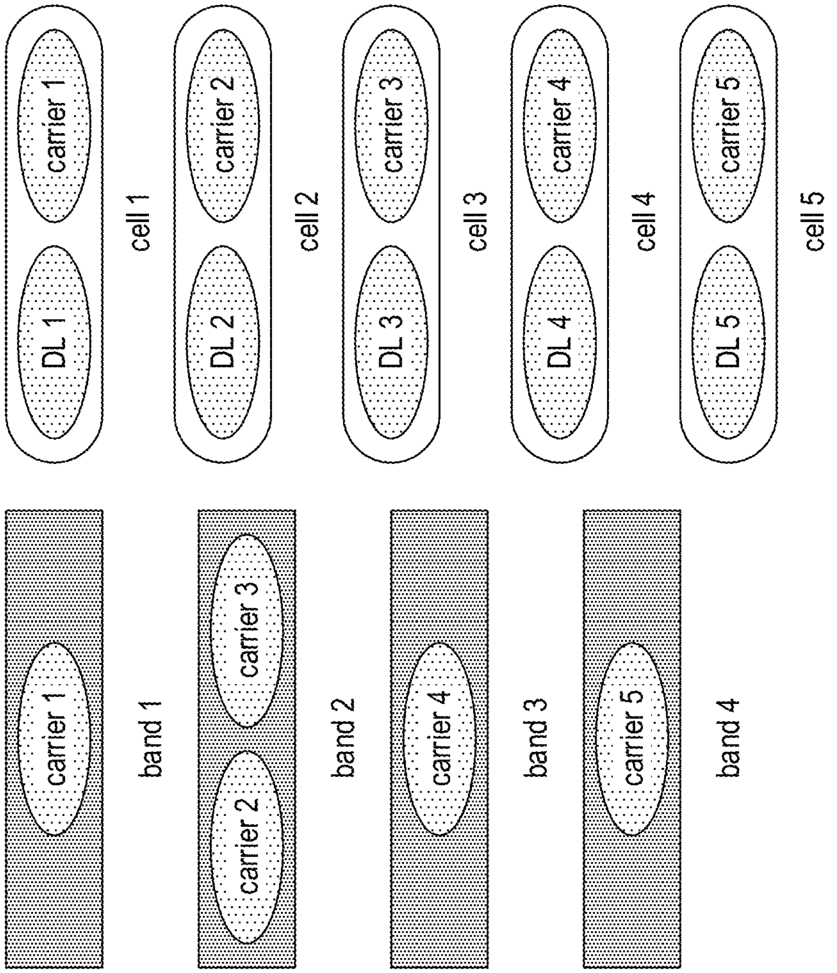
FIG. 8 shows another example of transmission switching based on some embodiments of the disclosed technology.
Figure 9:
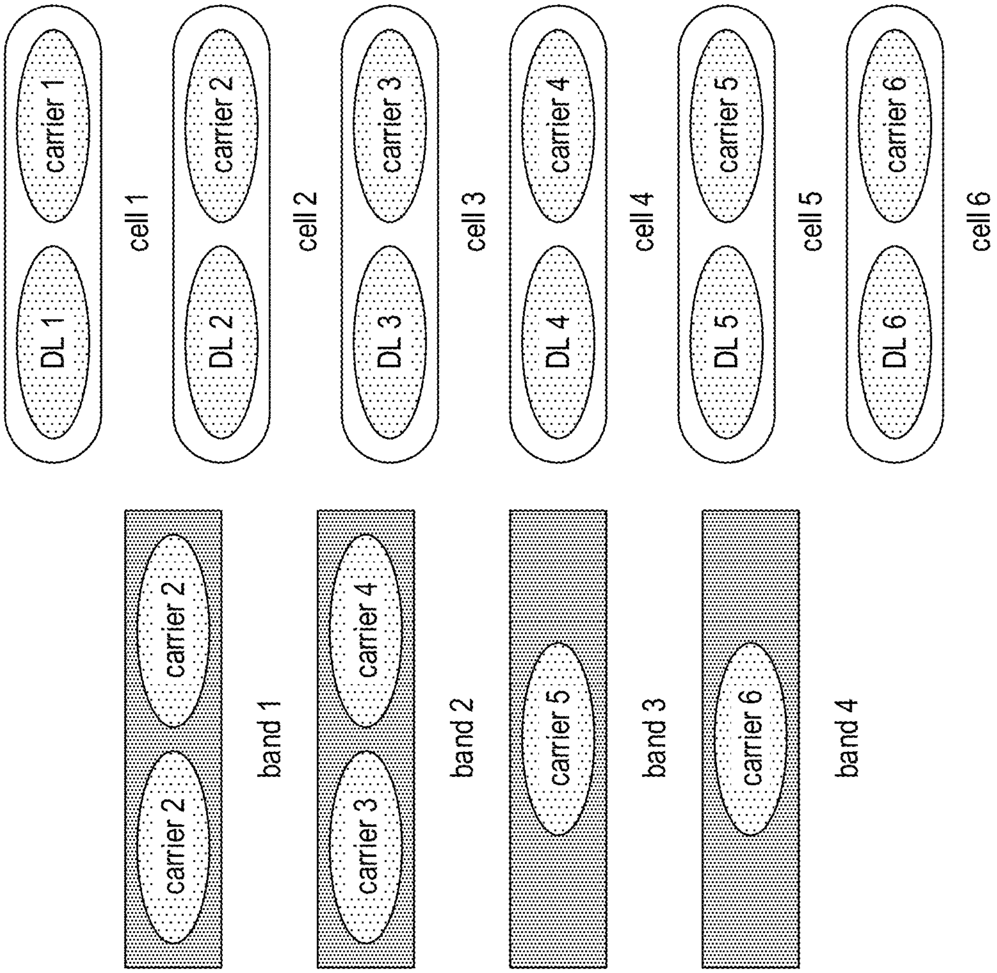
FIG. 9 shows another example of transmission switching based on some embodiments of the disclosed technology.

FIG. 5 shows an example of transmission switching based on some embodiments of the disclosed technology. FIG. 6 shows another example of transmission switching based on some embodiments of the disclosed technology. FIG. 7 shows another example of transmission switching based on some embodiments of the disclosed technology. FIG. 8 shows another example of transmission switching based on some embodiments of the disclosed technology. FIG. 9 shows another example of transmission switching based on some embodiments of the disclosed technology.

The disclosed technology can be implemented in some embodiments to, a Tx switching can be performed within 3 or more bands. In a case where two bands (no matter two or three carriers) are selected dynamically, R16/R17 Tx switching can be reused between or among the carriers on the two bands. If two bands with four carriers are selected dynamically, R16/R17 Tx switching can be used between or among the carriers on the two bands, and the disclosed technology can be implemented in some embodiments to include this new case of four carriers.

In some implementations, dynamic selection is based on semi-statically configured 3 bands or 4 bands to achieve agnostic with the number of bands.

Under the current standard, two bands can be configured for UE to perform TX switching. Two bands can include band A (carrier 1), which is for SUL or non-SUL, and band B (only carrier 2, or carrier 2 and carrier 3), which is a non-SUL band.

In a case that three bands (band A+band B+band C) are configured, only two bands can be dynamically selected to perform UL TX switching. Assuming band C is similar to band A or band B, the following options and alternatives can be implemented based on some embodiments of the disclosed technology.

Option1: band A is for SUL or non-SUL, band B is a non-SUL band, and band C is for SUL or non-SUL. That is, band C is similar to band A.

Alternative 1-1: carrier 1 (band A)+carrier 2 (band B)+carrier 3 (band C)

Alternative 1-2: carrier 1 (band A)+carrier 2&3 (band B)+carrier 4 (band C)

Option2: band A is for SUL or non-SUL, band B is a non-SUL band, and band C is a non-SUL band. That is, band C is similar to band B.

Alternative 2-1: carrier 1 (band A)+carrier 2 (band B)+carrier 3&4 (band C)

Alternative 2-2: carrier 1 (band A)+carrier 2&3 (band B)+carrier 4&5 (band C)

In a case that four bands (band A+band B+band C+band D) are configured, only two bands can be dynamically selected to perform UL TX switching. Assuming band D is similar to band A or band B, the following options and alternatives can be implemented based on some embodiments of the disclosed technology.

Option1: band A is for SUL or non-SUL, band B is a non-SUL band, and band C is for SUL or non-SUL. That is, band C is similar to band A.

Alternative 1-1-1: carrier 1 (band A)+carrier 2 (band B)+carrier 3 (band C)+carrier 4 (band D)

Alternative 1-1-2: carrier 1 (band A)+carrier 2 (band B)+carrier 3 (band C)+carrier 4&5 (band D)

Alternative 1-2-1: carrier 1 (band A)+carrier 2&3 (band B)+carrier 4 (band C)+carrier 5 (band D)

Alternative 1-2-2: carrier 1 (band A)+carrier 2&3 (band B)+carrier 4 (band C)+carrier 5&6 (band D)

Option2: band A is for SUL or non-SUL, band B is a non-SUL band, and band C is a non-SUL band. That is, band C is similar to band B.

Alternative 2-1-1: carrier 1 (band A)+carrier 2 (band B)+carrier 3&4 (band C)+carrier 5 (band D)

Alternative 2-1-2: carrier 1 (band A)+carrier 2 (band B)+carrier 3&4 (band C)+carrier 5&6 (band D)

Alternative 2-2-1: carrier 1 (band A)+carrier 2&3 (band B)+carrier 4&5 (band C)+carrier 6 (band D)

Alternative 2-2-2: carrier 1 (band A)+carrier 2&3 (band B)+carrier 4&5 (band C)+carrier 6&7 (band D)

After two bands are selected, in a case that two or three carriers are determined, TX switching can be performed in the same way as the current standard. In a case that four carriers are determined, TX switching are performed based on some embodiments of the disclosed technology.

For SUL, if paired carriers on two bands (e.g., band 1 and band 2) are selected, there is only one cell with supplementary UL (SUL) and normal UL (NUL). For example, as shown in FIG. 5, only cell 1 from band 1 and band 2 is selected from three cells configured in four bands. In the case of band 2 with two carriers, another cell with only NUL is also selected. That is, one or two cells will be selected. For example, as shown in FIG. 6, cell 1 and cell 2 from band 1 and band 2 are selected from four cells configured in four bands.

For CA, if the two, three, or four carriers on two bands are selected, two, three, or four cells are selected. For example, as shown in FIG. 7, cell 1 and cell 2 from band 1 and band 2 are selected from four cells configured in four bands. For example, as shown in FIG. 8, cell 1, cell 2, and cell 3 from band 1 and band 2 are selected from five cells configured in four bands. For example, as shown in FIG. 9, cell 1, cell 2, cell 3 and cell 4 from band 1 and band 2 are selected from six cells configured in four bands.

In this way, the UL transmission can be scheduled on the cell within the selected cells set.

The disclosed technology can be implemented in some embodiments to select the cells/carriers/bands which are within two bands.

Embodiment 1

Assuming the configured or activated cells are a set of cells for dynamic cell selection. The set of cells can be configured or activated from more than 2 bands. The selected cells are within at most 2 bands.

The set of cells for cell selection can include only SCells, or both SCells and PCell.

Option 1: The set of cells includes only SCells. In this case, a selection signaling is used to select the cells within the configured cells or the activated SCells.

For example, there are carrier 1 in band 1, carrier 2 in band 2, carrier 3 in band 3, carrier 4 in band 4, and for CA operation, then there are four cells, cell 1 including carrier 1, cell 2 including carrier 2, cell 3 including carrier 3, cell 4 including carrier4. wherein cell 1 is PCell, then cell 2,3,4 can be in the set of cells.

Option 2: The set of cells includes PCell and SCells. In this case, a selection signaling is used to select the cells within the configured cells or the activated SCells. If the PCell is included in the selected cells, there are no additional issues. If the PCell is not included in the selected cells, then the new PCell in the selected cells set without the original PCell should be determined. The new PCell is determined as discussed below.

Alternative 1: the lowest index in the set of selected cells.

Alternative 2: additional indication to indicate the new PCell. Further, if a cell is scheduled by the original PCell and also is selected, the new PCell is used to schedule the cell instead of the original PCell, and the CCS (cross carrier scheduling) configuration on the cell is used.

In this way, the cell selection based on some implementations of the disclosed technology can be used to configure up to 2 bands from more than 2 bands. It is beneficial to comply with the current standard, because the L1 based scheduling is based on a cell indication (e.g., CIF corresponding to each cell), not the band/carrier, although TX switching is described based on carriers. The higher layer signaling configuration structure can be based on the current standard.

Embodiment 2

Assuming the configured or activated cells are a set of cells for dynamic cell selection. The set of cells can be configured or activated from more than 2 bands. The selected cells are within at most 2 bands.

For SUL, if paired carriers on two bands (e.g., band 1 and band 2) are selected, there is only one cell with SUL and NUL. If band 2 with two carriers is selected, then another cell with only NUL is also selected. For CA, if the two, three, or four carriers on two bands are selected, three or four cells are selected.

In some implementations of the disclosed technology, the selection signaling can be indicated by group common DCI or UE-specific DCI, as will be discussed below.

Alternative 1: The disclosed technology can be implemented in some embodiments to use DCI format 2_0. In some implementations, an indication for cell selection/switching is added to the Format 2_0. In this case, a group of UE may change the selected cells dynamically. For example, a set of cells is configured from 4 bands, and four sub-sets of cells within the set of cells are also configured, and each sub-set of cells is configured within 2 bands. In this case, 2-bit field in format 2_0 is used for cell selection/switching and one sub-set is indicated every time.

Alternative 2: The disclosed technology can be implemented in some embodiments to use a DCI format 2_x like format 2_2/2_3. That is, each field in the format is only for a UE and the format is used for a group of UEs. Each field size can be configured and can be different. For example, for a UE, a set of cells is configured from 4 bands, and four sub-sets of cells within the set of cells are also configured and sub-set of cells are configured within 2 bands. In this case, 2-bit field for this UE in format 2_x is used for cell selection/switching and one sub-set is indicated every time.

Alternative 3: The disclosed technology can be implemented in some embodiments to use DCI format 2_6. The bit field for SCell dormancy can be reused for SCell selection. In addition, SCell dormancy and SCell selection can be both configured and can be cyclic redundancy check (CRC) scrambled by a different radio network temporary identifier (RNTI). Alternatively, an independent field for SCell selection in format 2_6 is used. For example, where there are N bits configured for SCell selection and each bit corresponds to one or more cells, the selected sub-set of cells is indicated with "1" in the bitmap of the N bits.

Alternative 4: The disclosed technology can be implemented in some embodiments to use UE-specific DCI format. One field for cell selection/switching is in at least one of formats 0_0/0_1/0_2/1_0/1_1/1_2. Further, if the scheduled PDSCH/PUSCH by the same DCI for cell selection on the cell is not included in the selecting cells, then the following operations can be performed: (1) UE does not expect the scheduling or an error has occurred in the scheduling; (2) the PDSCH/PUSCH without a timeline is dropped or canceled; (3) based on a rule to determine whether to perform the PDSCH/PUSCH or not, i.e., high priority PDSCH/PUSCH will be performed and low priority PDSCH/PUSCH will be dropped or canceled. If the scheduled PDSCH/PUSCH by the same DCI for cell selection on the cell is in the selecting cells, then the following operations can be performed: (1) the selection time is included in Tproc2 which is the minimum time UE needs to prepare the PUSCH and is different from the time for TX switching; (2) the selection time is included in the time for TX switching. Alternatively, the cell selection/switching is used only when there is no data transmission. That is, it is not considered whether the scheduled PDSCH/PUSCH by the same DCI for cell selection on the cell is in the selecting cells or not.

In this way, the cell selection based on some implementations of the disclosed technology can be used to achieve up to 2 bands from more than 2 bands based on group common DCI or UE-specific DCI. It is beneficial to select cells which are within the up to bands and then the TX switching can be performed as legacy manner which the two bands are always configured. The higher layer signaling configuration structure can be based on the current standard. In addition, implementations associated with the number of bands can be achieved by the cell selection method.

Embodiment 3

Assuming the configured or activated cells are a set of cells for dynamic cell selection. The set of cells can be configured or activated from more than 2 bands. The selected cells are within at most 2 bands.

For SUL, if the paired carriers on two bands (e.g., band 1 and band 2) are selected, there is only one cell with SUL and NUL. If band 2 with two carriers is selected, then another cell with only NUL is also selected. For CA, if the two, three or four carriers on two bands are selected, two, three or four cells are selected.

The selection signaling can be indicated by group common DCI or UE-specific DCI, as discussed in other embodiments. The indication manner of the selection signaling field in the DCI based on some implementations of the disclosed technology includes at least one of following alternatives.

Alternative 1: Bitmap. The field size is based on the configured cells number, because the activated cells number can be updated by MAC CE, which is not used to determine the size of the field.

Alternative 2: N bits to indicate the cell group. For example, 1-3 bits can be enough. A code-point for cell groups with several cells and the cells in each cell group are within two bands. For example, 3 bands are configured or activated, that is carrier 1 (band A), carrier 2&3 (band B) and carrier 4&5 (band C), the code-point is configured as shown in Table 1 or Table 2. For each code-point, i.e., N=01, the selected cells are within two bands. In case all potential cells combination on two bands can be indicated and the rest code-point can be reserved or used to indicate the cells in one band.

TABLE 1

| for SUL (band A is for SUL) | |
|---|---|
| N = 2 | Cell group (2 bands selected within 3 bands) |
| 00 | Cell 1(carrier 1, carrier 2), cell 2(carrier 3) |
| 01 | Cell 3(carrier 1, carrier 4), cell 4(carrier 5) |
| 10 | Cell 5(carrier 2), cell 2(carrier 3), cell 6(carrier 4), cell 4(carrier 5) |
| 11 | Reserved or indicate the cells in one band |

TABLE 2

| for CA | |
|---|---|
| N = 2 | Cell group (2 bands selected within 3 bands) |
| 00 | Cell 1(carrier 1), cell 2(carrier 2), cell 3(carrier 3) |
| 01 | Cell 1(carrier 1), cell 4(carrier 4), cell 5(carrier 5) |
| 10 | cell 2(carrier 2), cell 3(carrier 3), cell 4(carrier 4), cell 5(carrier 5) |
| 11 | Reserved or indicate the cells in one band |

Alternative 3: bitmap and each bit corresponding to a group of cells. For example, where there are N bits configured for SCell selection and each bit corresponds to one or more cells, the selected sub-set of cells is indicated with "1" in the bitmap of the N bits.

In this way, the cell selection based on some implementations of the disclosed technology can be used to achieve up to 2 bands from more than 2 bands based on group common DCI or UE-specific DCI. It is beneficial to select cells that are within the maximum number of bands and then the TX switching can be performed in the same manner as the legacy scheme which always configured the two bands. The higher layer signaling configuration structure can be based on the current standard. In addition, implementations associated with the number of bands can be achieved by the cell selection method.

Embodiment 4

Assuming the configured or activated cells are a set of cells for dynamic cell selection. The set of cells can be configured or activated from more than 2 bands. The selected cells are within at most 2 bands.

For SUL, if the paired carriers on two bands (e.g., band 1 and band 2) are selected, there is only one cell with SUL and NUL. If band 2 with two carriers, then another cell with only NUL is also selected. For CA, if the two, three or four carriers on two bands are selected, two, three, or four cells are selected.

The selection signaling can be indicated by Medium Access Control (MAC) Control Element (CE), as will be discussed below.

Alternative 1: An independent MAC CE for cell selection. In addition, it is identified by a MAC subheader with LCID or eLCID (extended Logical Channel ID). An indication in the MAC CE can be each bit corresponding to a cell to indicate whether to select or not, or can be each bit corresponding to a group of cells to indicate whether to select or not.

Figure 10:
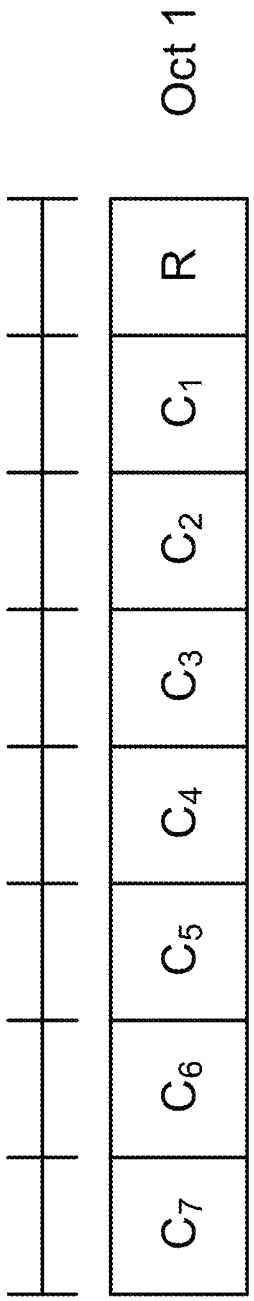
FIG. 10 shows an example of a single octet including seven C-fields and one R-field.

FIG. 10 shows an example of a single octet including seven C-fields and one R-field.

For example, the indication in the MAC CE can include a single octet containing seven C-fields and one R-field as shown in FIG. 10, or can include multiple octets. Here, each bit Ci corresponds to a cell or a group of cells. For example, the bit set to 1 indicates that the cell or the group of cells are selected. The MAC CE for cell selection and the MAC CE for SCell activation can be performed as follows: Scheme 1: MAC CE for cell selection has a higher priority than the MAC CE for SCell activation. For example, if a deactivated cell is selected, that cell is selected and activated. Scheme 2: MAC CE for cell selection has a lower priority than the MAC CE for SCell activation. For example, if a deactivated cell is selected, the deactivated cell is not used.

Alternative 2: The MAC CE for SCell activation is reused. That is, the MAC CE for SCell activation is used if dynamic changing of the cells in 2 bands among 3 or 4 bands is needed. The MAC CE is used as follows: Scheme 1: using the reserved bit R in the MAC CE to indicate the MAC CE is used for SCell activation or cell selection. Scheme 2: extended bits are used, i.e., 2 bits for each cell and one of four states (activation, deactivation, selected, non-selected) can be indicated. Scheme 3: the activated cells are the selected cells. That is, the scheme 3 reuses the MAC CE for SCell activation.

In this way, the cell selection based on some implementations of the disclosed technology can be used to achieve up to 2 bands from more than 2 bands based on MAC CE. It is beneficial to select cells that are within the maximum number of bands and the TX switching can be performed in the same manner as the legacy scheme, which always configures the two bands. The higher layer signaling configuration structure can be based on the current standard. In addition, implementations associated with the number of bands can be achieved by the cell selection method.

Embodiment 5

Assuming the configured or activated cells are a set of cells for dynamic cell selection. The set of cells can be configured or activated from more than 2 bands. The selected cells are within at most 2 bands.

For SUL, if the paired carriers on two bands (e.g., band 1 and band 2) are selected, there is only one cell with SUL and NUL. If band 2 with two carriers, then another cell with only NUL is also selected. For CA, if the two, three or four carriers on two bands are selected, two, three, or four cells are selected.

The disclosed technology can be implemented in some embodiments to configure cells as will be discussed below.

Alternative 1: The configured cells should be the supported cells in the band combination defined in the standard. For example, in the current SUL or CA band combination, only one SUL band can be used with one or more CA band, and CA band combination can support up to 5 bands. That is, the cells configured within 3 or 4 bands can only include one cell with SUL carrier. For example, cells from 3 bands, that is, SUL band A+NUL band B+SUL band C, cannot be configured/supported, i.e., cell 1 (DL, SUL1 in band A, NUL1 in band B), cell 2 (DL, SUL2 in band C, NUL2 in band B). For another example, cells from 4 bands, that is, SUL band A+NUL band B+SUL band C+NUL band D cannot be configured/supported, i.e., cell 1 (DL, SUL1 in band A, NUL1 in band B), cell 2(DL, SUL2 in band C, NUL2 in band D).

Alternative 2: The configured cells can be any cells and the selected cell in the bands should be the supported cells in the band combination defined in the standard. This will result in the examples in Alternative 1, and at most one cell with SUL carrier can be selected.

Embodiment 6

Assuming the configured or activated cells are a set of cells for dynamic cell selection. The set of cells can be configured or activated from more than 2 bands. The selected cells are within at most 2 bands.

For SUL, if the paired carriers on two bands (e.g., band 1 and band 2) are selected, there is only one cell with SUL and NUL. If band 2 with two carriers, then another cell with only NUL is also selected. For CA, if the two, three or four carriers on two bands are selected, that is two, three, or four cells are selected.

In some implementations of the disclosed technology, in a case that four carriers on two bands are selected, the TX switching can be performed as will be discussed below.

In the case of 1Tx-2Tx switching for 4 carriers, the switching cases for SUL and UL CA Option 1 are listed in Table 3 below.

TABLE 3

4 carriers in 1Tx-2Tx switching cases for SUL and UL CA Option 1

| | Number of Tx chains in WID (band 1 + band 2) | Number of antenna ports for UL transmission (band 1 (carrier 1 carrier 2) + band 2 (carrier 3 + carrier 4)) |
|---|---|---|
| Case 1 | 1T + 1T | (1P + 0P) + (0P + 0P), (1P + 1P) + (0P + 0P), (0P + 1P) + (0P + 0P) |
| Case 2 | 0T + 2T | (0P + 0P) + (2P + 0P), (0P + 0P) + (0P + 2P), (0P + 0P) + (2P + 2P), (0P + 0P) + (1P + 0P), (0P + 0P) + (0P + 1P), (0P + 0P) + (1P + 1P), (0P + 0P) + (1P + 2P), (0P + 0P) + (2P + 1P) |

In the case 1 of Table 3, (1P+1P)+(0P+0P) can be used for CA option 1 only and cannot be used for SUL.

In the case of 1Tx-2Tx switching for 4 carriers, the switching cases for UL CA Option 2 are listed in Table 4.

TABLE 4

4 carriers in 1Tx-2Tx switching cases for UL CA Option 2

| | Number of Tx chains in WID (band 1 + band 2) | Number of antenna ports for UL transmission (band 1 (carrier 1 + carrier 2) + band B (carrier 3 + carrier 4)) |
|---|---|---|
| Case 1 | 1T + 1T | (1P + 0P) + (0P + 0P), (1P + 1P) + (0P + 0P), (0P + 1P) + (0P + 0P), (1P + 0P) + (1P + 0P), (1P + 1P) + (1P + 0P), (0P + 1P) + (1P + 0P), (1P + 0P) + (0P + 1P), (1P + 1P) + (0P + 1P), (0P + 1P) + (0P + 1P), (1P + 0P) + (1P + 1P), (1P + 1P) + (1P + 1P), (0P + 1P) + (1P + 1P), (0P + 0P) + (1P + 0P), (0P + 0P) + (0P + 1P), (0P + 0P) + (1P + 1P) |
| Case 2 | 0T + 2T | (0P + 0P) + (2P + 0P), (0P + 0P) + (0P + 2P), (0P + 0P) + (2P + 2P), (0P + 0P) + (1P + 0P), (0P + 0P) + (0P + 1P), (0P + 0P) + (1P + 1P), (0P + 0P) + (1P + 2P), (0P + 0P) + (2P + 1P) |

In the case of 2Tx-2Tx switching for 4 carriers, the switching cases for SUL and UL CA Option 1 are listed in Table 5.

TABLE 5

4 carriers in 2Tx-2Tx switching cases for SUL and UL CA Option 1

| | Number of Tx chains in WID (band 1 + band 2) | Number of antenna ports for UL transmission (band 1 (carrier 1 + carrier 2) + band 2 (carrier 3 + carrier 4)) |
|---|---|---|
| Case 1 | 0T + 2T | (0P + 0P) + (2P + 0P), (0P + 0P) + (0P + 2P), (0P + 0P) + (2P + 2P), (0P + 0P) + (1P + 0P), (0P + 0P) + (0P + 1P), (0P + 0P) + (1P + 1P), (0P + 0P) + (1P + 2P), (0P + 0P) + (2P + 1P) |
| Case 2 | 2T + 0T | (2P + 0P) + (0P + 0P), (0P + 2P) + (0P + 0P), (2P + 2P) + (0P + 0P), (1P + 0P) + (0P + 0P), (0P + 1P) + (0P + 0P), (1P + 1P) + (0P + 0P), (1P + 2P) + (0P + 0P), (2P + 1P) + (0P + 0P) |

In the case of 2Tx-2Tx switching for 4 carriers, the switching cases for UL CA Option 2 are listed in Table 6.

TABLE 6

4 carriers in 2Tx-2Tx switching cases for UL CA Option 2

| | Number of Tx chains in WID (band A + band B) | Number of antenna ports for UL transmission (band A (carrier 1) + band B (carrier 2 + carrier 3)) |
|---|---|---|
| Case 1 | 1T + 1T | (1P + 0P) + (0P + 0P), (1P + 1P) + (0P + 0P), (0P + 1P) + (0P + 0P), (1P + 0P) + (1P + 0P), (1P + 1P) + (1P + 0P), (0P + 1P) + (1P + 0P), (1P + 0P) + (0P + 1P), (1P + 1P) + (0P + 1P), (0P + 1P) + (0P + 1P), (1P + 0P) + (1P + 1P), (1P + 1P) + (1P + 1P), (0P + 1P) + (1P + 1P), (0P + 0P) + (1P + 0P), (0P + 0P) + (0P + 1P), (0P + 0P) + (1P + 1P) |
| Case 2 | 0T + 2T | (0P + 0P) + (2P + 0P), (0P + 0P) + (0P + 2P), (0P + 0P) + (2P + 2P), (0P + 0P) + (1P + 0P), (0P + 0P) + (0P + 1P), (0P + 0P) + (1P + 1P), (0P + 0P) + (1P + 2P), (0P + 0P) + (2P + 1P) |
| Case 3 | 2T + 0T | (2P + 0P) + (0P + 0P), (0P + 2P) + (0P + 0P), (2P + 2P) + (0P + 0P), (1P + 0P) + (0P + 0P), (0P + 1P) + (0P + 0P), (1P + 1P) + (0P + 0P), (1P + 2P) + (0P + 0P), (2P + 1P) + (0P + 0P) |

As discussed above, the disclosed technology can be implemented in some embodiments to receive, by a user device, a signaling for a cell selection to select a subset of cells within up to two bands out of a set of cells within three or more bands, and perform, by the user device, a transmission on one or more cells within the selected subset of cells.

Assuming the configured or activated cells are a set of cells for dynamic cell selection. The set of cells can be configured or activated from more than 2 bands. The selected cells are within at most 2 bands.

In some implementations, the set of cells for selection can be only SCells or both SCells and PCell.

In one example, a selection signaling is used to select the cells within the configured cells or the activated SCells. If the PCell is not included in the selected cells, then the new PCell in the selected set of cells is determined by one of the following alternatives: (1) the lowest index in the selected cells set; (2) additional indication to indicate the new PCell.

In some implementations, the selection signaling can be indicated by group common DCI or UE-specific DCI. When using UE-specific DCI, the cell selection is combined with no data transmission, or an additional mechanism can be implemented with respect to the scheduled PDSCH/PUSCH by the same DCI for cell selection on the cell is included in the selecting cells.

In some implementations, the indication manner of the selection signaling field in the DCI includes one of the following alternatives: (1) bitmap; (2) N bits to indicate the cell group; (3) bitmap and each bit corresponding to a group of cells.

In some implementations, the selection signaling can be indicated by MAC CE: (1) in one example, an independent MAC CE is used for cell selection. The MAC CE can include MAC CE for cell selection and MAC CE for SCell activation. In one example, MAC CE for cell selection has a higher priority than the MAC CE for SCell activation. If a deactivated cell is selected, that cell is selected and activated. In another example, MAC CE for cell selection has a lower priority than the MAC CE for SCell activation. For example, if a deactivated cell is selected, that cell is not used; (2) In another example, the MAC CE for SCell activation is reused. The MAC CE can be used as follows. In one example, the reserved bit R in the MAC CE is used to indicate the MAC CE is used for SCell activation or cell selection. In another example, extended bits are used, e.g., 2 bits for each cell and one of four states (activation, deactivation, selected, non-selected) can be indicated. In another example, when the activated cells are the selected cells, the scheme 3 can reuse the MAC CE for SCell activation.

Figure 11:
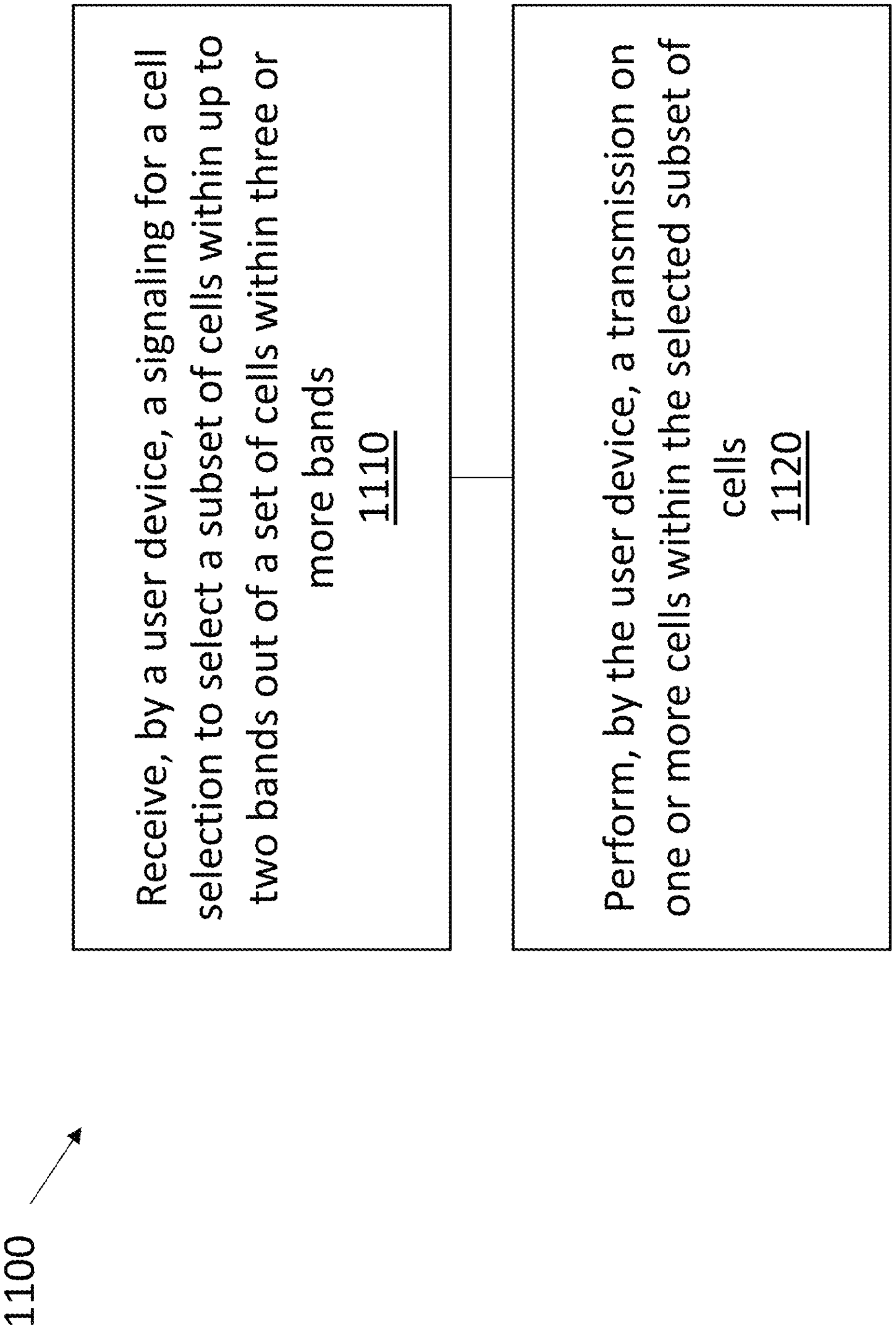
FIG. 11 shows an example of a process for wireless communication based on some example embodiments of the disclosed technology.

FIG. 11 shows an example of a process for wireless communication based on some example embodiments of the disclosed technology.

In some implementations, the process 1100 for wireless communication may include, at 1110, receiving, by a user device, a signaling for a cell selection to select a subset of cells within up to two bands out of a set of cells within three or more bands, and at 1120 performing, by the user device, a transmission on one or more cells within the selected subset of cells.

In some embodiments, the cell selection can include a cell switching. In some embodiments, the transmission on one or more cells within the selected subset of cells includes performing an uplink transmission switching operation on uplink carriers within the up to two bands.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term “data processing apparatus” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising: receiving, by a user device, a signaling for a cell selection to select a subset of cells within up to two bands out of a set of cells within three or more bands; and performing, by the user device, a transmission on one or more cells within the selected subset of cells. In some implementations, the cell selection can include a cell switching.

Clause 2. The method of clause 1, wherein the transmission on one or more cells within the selected subset of cells includes: performing an uplink transmission switching operation on uplink carriers within the up to two bands.

Clause 3. The method of any of clauses 1-2, wherein the set of cells within the three or more bands include secondary cells (SCells) only.

Clause 4. The method of any of clauses 1-2, wherein the set of cells within the three or more bands include a primary cell and secondary cells (SCells). In some implementations, if both Master Cell Group (MCG) and Secondary Cell Group (SCG) are configured, the primary cell in MCG is PCell, and the primary cell in SCG is PSCell (Primary secondary cell).

Clause 5. The method of clause 4, wherein, in a case that the primary cell is not included in the selected subset of cells, a new primary cell is determined by: a cell with the lowest index in the selected subset of cells; or an independent indication together with the cell selection signaling.

Clause 6. The method of clause 1, wherein the signaling includes a group common downlink control information (DCI) or a user equipment (UE)-specific DCI.

Clause 7. The method of clause 6, wherein the cell selection is indicated in the group common DCI by at least one of: an indication for selection of a subset of cells for a group of UEs; multiple indication fields for selection of a subset of cells for a group of UEs and each indication field for a UE; or using SCell dormancy indication for cell selection.

Clause 8. The method of clause 6, wherein the UE-specific DCI includes a field for cell selection.

Clause 9. The method of clause 8, wherein, in a case that a physical uplink shared channel (PUSCH) scheduled on a cell according to the UE-specific DCI is not included in the selected subset of cells, the UE performs operations including at least one of: a determination that an error has occurred in a scheduling; a dropping or cancellation of the PUSCH; a dropping or cancellation of the PUSCH that exceeds a timeline; a transmission of the PUSCH with a first priority; or a dropping or cancellation of the PUSCH with a second priority, wherein the first priority has a higher priority than the second priority. In some implementations, a first priority is priority index 1 which is a higher priority, and a second priority is priority index 0 which is a lower priority.

Clause 10. The method of clause 8, wherein, in a case that a PUSCH scheduled on a cell according to the UE-specific DCI is included in the selected subset of cells, a selection time for the cell selection is included in: a minimum time that is required for UE PUSCH preparation and is different from a time for uplink transmission switching; or the time for uplink transmission switching.

Clause 11. The method of clause 8, wherein the UE-specific DCI used for the cell selection is used with no uplink shared channel (UL-SCH) transmission.

Clause 12. The method of clause 6, wherein an indication of one or more bit fields for the cell selection in the group common DCI or the UE-specific DCI includes at least one of: using a bitmap to indicate the selected subset of cells such that each bit corresponds to a cell in the set of cells; using N bits to indicate the selected subset of cells, where N is a positive integer; or using a bitmap to indicate the selected subset of cells such that each bit corresponds to a group of cells in the set of cells.

Clause 13. The method of clause 1, wherein the signaling includes a medium access control (MAC) control element (CE).

Clause 14. The method of clause 13, wherein the MAC CE is an independent MAC CE for cell selection. In some implementations, the cell selection signaling MAC CE is indicated or identified by a MAC subheader with an independent logical channel identifier (LCD) or an extended LCD.

Clause 15. The method of clause 14, wherein a cell indicated by the MAC CE for cell selection is not overridden by the MAC CE for SCell activation. In some implementations, the MAC CE for SCell activation can indicate a SCell can be activated or deactivated by the MAC CE.

Clause 16. The method of clause 14, wherein a cell indicated by the MAC CE for cell selection is overridden by the MAC CE for SCell activation.

Clause 17. The method of clause 13, wherein an MAC CE for SCell activation is used for the cell selection and includes at least one of: using a reserved bit to indicate whether the MAC CE is used for SCell activation or cell selection; the MAC CE for SCell activation includes two bits for each cell to indicate up to four different states of each cell; or the SCells activated by the MAC CE for SCell activation are the selected subset of cells.

Clause 18. The method of any of clauses 14 and 17, wherein the subset of cells further comprises the primary cell.

Clause 19. An apparatus for wireless communication comprising a processor that is configured to carry out the method of any of clauses 1 to 18.

Clause 20. A non-transitory computer readable medium having code stored thereon, the code when executed by a processor, causing the processor to implement a method recited in any of clauses 1 to 18.

Clause 21. A method of operating a wireless network between a base station and a wireless device, wherein the wireless device is configured to implement a method described in clauses 1 to 20.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

receiving, by a user device, a radio resource control (RRC) signaling that indicates a set of cells associated with three or more bands;

receiving, by the user device, a downlink control information (DCI) signaling for a dynamic uplink transmission switching operation to select a subset of cells out of the set of cells and up to two bands out of the three or more bands; and performing, by the user device, a transmission on one or more cells within the selected subset of cells while performing the dynamic uplink transmission switching operation within the up to two bands based on the DCI signaling without requiring RRC reconfiguration, wherein, in response to the selected subset of cells not including a cell on which a physical uplink shared channel (PUSCH) transmission has been scheduled according to the DCI signaling, the scheduled PUSCH transmission being scheduled by the same DCI signaling used to select the subset of cells, and the cell on which the PUSCH transmission has been scheduled being outside the selected subset of cells as a result of the dynamic uplink transmission switching operation, the user device performs operations comprising at least one of: (i) determining that an error has occurred in scheduling; (ii) dropping or canceling the scheduled PUSCH transmission; or (iii) handling the scheduled PUSCH transmission according to a priority rule such that a higher-priority PUSCH is transmitted and a lower-priority PUSCH is dropped or canceled.

2. The method of claim 1, wherein the set of cells within the three or more bands include a primary cell and secondary cells (SCells).

3. The method of claim 2, wherein, in response to the selected subset of cells not including the primary cell, a new primary cell is determined by: a cell with a lowest index in the selected subset of cells; or an independent indication together with the cell selection signaling.

4. The method of claim 1, wherein the DCI signaling includes a group common downlink control information (DCI) or a user equipment (UE)-specific DCI.

5. The method of claim 4, wherein the cell selection is indicated in the group common DCI by at least one of:

an indication for selection of a subset of cells for a group of UEs;

multiple indication fields for selection of a subset of cells for a group of UEs and each indication field for a UE; or using SCell dormancy indication for cell selection.

6. The method of claim 4, wherein the UE-specific DCI includes a field for cell selection.

7. The method of claim 6, wherein, in response to the selected subset of cells including a PUSCH scheduled on a cell according to the UE-specific DCI, a selection time for the cell selection is included in:

a minimum time that is required for UE PUSCH preparation and is different from a time for uplink transmission switching; or the time for uplink transmission switching.

8. The method of claim 6, wherein the UE-specific DCI used for the cell selection is used with no uplink shared channel (UL-SCH) transmission.

9. The method of claim 4, wherein an indication of one or more bit fields for the cell selection in the group common DCI or the UE-specific DCI includes at least one of:

using a bitmap to indicate the selected subset of cells such that each bit corresponds to a cell in the set of cells;

using N bits to indicate the selected subset of cells, where N is a positive integer; or using a bitmap to indicate the selected subset of cells such that each bit corresponds to a group of cells in the set of cells.

10. The method of claim 1, wherein the set of cells comprise one or more cells with a supplementary uplink (SUL), and the subset of cells comprise at most one cell with SUL.

11. A user device for wireless communication comprising at least one processor that is configured to carry out a method comprising:

receiving, by the user device, a radio resource control (RRC) signaling that indicates a set of cells associated with three or more bands;

receiving, by the user device, a downlink control information (DCI) signaling for a dynamic uplink transmission switching operation to select a subset of cells out of the set of cells and up to two bands out of the three or more bands; and performing, by the user device, a transmission on one or more cells within the selected subset of cells while performing the dynamic uplink transmission switching operation within the up to two bands based on the DCI signaling without requiring RRC reconfiguration, wherein, in response to the selected subset of cells not including a cell on which a physical uplink shared channel (PUSCH) transmission has been scheduled according to the DCI signaling, the scheduled PUSCH transmission being scheduled by the same DCI signaling used to select the subset of cells, and the cell on which the PUSCH transmission has been scheduled being outside the selected subset of cells as a result of the dynamic uplink transmission switching operation, the user device performs operations comprising at least one of: (i) determining that an error has occurred in scheduling; (ii) dropping or canceling the scheduled PUSCH transmission; or (iii) handling the scheduled PUSCH transmission according to a priority rule such that a higher-priority PUSCH is transmitted and a lower-priority PUSCH is dropped or canceled.

12. The user device of claim 11, wherein the transmission on one or more cells within the selected subset of cells includes performing an uplink transmission switching operation on uplink carriers within the up to two bands.

13. The user device of claim 11, wherein the set of cells within the three or more bands include a primary cell and secondary cells (SCells).

14. The user device of claim 13, wherein, in response to the selected subset of cells not including the primary cell, a new primary cell is determined by: a cell with a lowest index in the selected subset of cells; or an independent indication together with the cell selection signaling.

15. The user device of claim 11, wherein the DCI signaling includes a group common downlink control information (DCI) or a user equipment (UE)-specific DCI.

16. The user device of claim 15, wherein the cell selection is indicated in the group common DCI by at least one of:

an indication for selection of a subset of cells for a group of UEs;

multiple indication fields for selection of a subset of cells for a group of UEs and each indication field for a UE; or using SCell dormancy indication for cell selection.

17. The user device of claim 15, wherein the UE-specific DCI includes a field for cell selection.

18. The user device of claim 17, wherein, in response to the selected subset of cells including a PUSCH scheduled on a cell according to the UE-specific DCI, a selection time for the cell selection is included in:

a minimum time that is required for UE PUSCH preparation and is different from a time for uplink transmission switching; or the time for uplink transmission switching.

19. The user device of claim 17, wherein the UE-specific DCI used for the cell selection is used with no uplink shared channel (UL-SCH) transmission.

20. The user device of claim 15, wherein an indication of one or more bit fields for the cell selection in the group common DCI or the UE-specific DCI includes at least one of:

using a bitmap to indicate the selected subset of cells such that each bit corresponds to a cell in the set of cells;

using N bits to indicate the selected subset of cells, where N is a positive integer; or using a bitmap to indicate the selected subset of cells such that each bit corresponds to a group of cells in the set of cells.

* * * * *